(12) United States Patent
Ogawa et al.

(10) Patent No.: US 11,218,049 B2
(45) Date of Patent: Jan. 4, 2022

(54) MOTOR

(71) Applicant: Nidec Corporation, Kyoto (JP)

(72) Inventors: Kosuke Ogawa, Kyoto (JP); Tatsuya Onishi, Kyoto (JP); Takashi Seguchi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 140 days.

(21) Appl. No.: 16/637,287

(22) PCT Filed: Sep. 20, 2018

(86) PCT No.: PCT/JP2018/034811
§ 371 (c)(1),
(2) Date: Feb. 7, 2020

(87) PCT Pub. No.: WO2019/065451
PCT Pub. Date: Apr. 4, 2019

(65) Prior Publication Data
US 2020/0251954 A1    Aug. 6, 2020

(30) Foreign Application Priority Data
Sep. 28, 2017 (JP) .............................. JP2017-188045

(51) Int. Cl.
*H02K 3/52* (2006.01)
*H02K 5/16* (2006.01)

(52) U.S. Cl.
CPC ............... *H02K 5/161* (2013.01); *H02K 3/52* (2013.01)

(58) Field of Classification Search
CPC ..... H02K 3/522; H02K 5/225; H02K 2203/09
See application file for complete search history.

(56) References Cited

U.S. PATENT DOCUMENTS 6,081,056 A * 6/2000 Takagi ..................... H02K 5/08
                                                         310/216.137
10,340,767 B2 * 7/2019 Atarashi .................. H02K 5/16
(Continued)

FOREIGN PATENT DOCUMENTS

JP    2008-079465 A    4/2008
JP    2008-228425 A    9/2008
JP    2009-024703 A    2/2009

OTHER PUBLICATIONS

Official Communication issued in International Patent Application No. PCT/JP2018/034811, dated Dec. 25, 2018.
(Continued)

*Primary Examiner* — Dang D Le
(74) *Attorney, Agent, or Firm* — Keating & Bennett

(57) ABSTRACT

In a motor, busbars each includes a grasping portion to grasp a conducting wire extending from a coil. A pair of arm portions in each of the grasping portions extend from a base portion to a same side in a circumferential direction. A busbar holder includes a busbar holder body, and a cylindrical first central tubular portion centered on a central axis, projecting to a second axial side from the busbar holder body. A bearing holder includes a first central hole portion centered on the central axis, and extending through the bearing holder in an axial direction. The first central tubular portion is fitted in the first central hole portion. One of the bearing holder and the busbar holder includes a hole portion recessed in the axial direction. Another one of the bearing holder and the busbar holder includes a fitting projection portion projecting in the axial direction. The fitting projection portion is fitted in the hole portion. An axial dimension of a portion of the first central tubular portion fitted in the (Continued)

first central hole portion is greater than an axial dimension of a portion of the fitting projection portion fitted in the hole portion.

9 Claims, 7 Drawing Sheets

(56) References Cited

U.S. PATENT DOCUMENTS

| | | |
|---|---|---|
| 2003/0201688 A1 | 10/2003 | Yamamura et al. |
| 2010/0133935 A1 | 6/2010 | Kinugawa et al. |
| 2015/0357878 A1 | 12/2015 | Fukunaga et al. |
| 2016/0294248 A1 | 10/2016 | Atarashi et al. |

OTHER PUBLICATIONS

Official Communication issued in International Patent Application No. PCT/JP2018/036191, dated Oct. 30, 2018.
Onishi et al., "Motor and Method of Manufacturing Motor", U.S. Appl. No. 16/637,286, filed Feb. 7, 2020.

* cited by examiner

MOTOR

CROSS REFERENCE TO RELATED APPLICATIONS

This is a U.S. national stage of PCT Application No. PCT/JP2018/034811, filed on Sep. 20, 2018, and priority under 35 U.S.C. § 119(a) and 35 U.S.C. § 365(b) is claimed from Japanese Application No. 2017-188045, filed Sep. 28, 2017; the entire disclosures of each application being hereby incorporated herein by reference.

FIELD OF THE INVENTION

The present invention relates to a motor.

BACKGROUND

In a known motor, a busbar holder which holds busbars is fitted to a bearing holder which holds a bearing. For example, a motor in which an insulating plate as a bearing holder and a busbar holder are fixed to each other through screws is known.

In the motor as described above, a conducting wire extending from a coil is passed through the bearing holder, and is connected to a busbar. Accordingly, an operator fits the busbar holder to the bearing holder after circumferentially positioning the busbar holder with respect to the bearing holder, and then connects the conducting wire to the busbar. However, when the busbar holder is fitted to the bearing holder as described above, a displacement of the position of the conducting wire extending from the coil or the like may make it difficult to arrange the conducting wire at a desired position with respect to the busbar. This may make it difficult to connect the conducting wire to the busbar.

SUMMARY

A motor according to an example embodiment of the present disclosure is a motor including a rotor including a shaft extending along a central axis, a stator including coils and radially opposite to the rotor with a gap therebetween, a bearing rotatably supporting the shaft, a bearing holder on a first axial side of the stator to hold the bearing, and a busbar unit on the first axial side of the bearing holder. The busbar unit includes a plurality of busbars electrically connected to the coils, and a busbar holder to hold the busbars and located on the first axial side of the bearing holder. Each of the plurality of busbars includes a grasping portion to grasp a conducting wire extending from one of the coils. The grasping portion includes a base portion, and a pair of arm portions extending from the base portion to a first circumferential side, and radially opposite to each other with a radial gap therebetween. The conducting wire extending from the coil is inserted in the radial gap between the pair of arm portions. The pair of arm portions in each of the grasping portions of the plurality of busbars extend from the base portion to the same side in a circumferential direction. The busbar holder includes a busbar holder body, and a cylindrical first central tubular portion centered on the central axis, and projecting to a second axial side from the busbar holder body. The bearing holder includes a first central hole portion centered on the central axis, and extending through the bearing holder in an axial direction. The first central tubular portion is fitted in the first central hole portion. One of the bearing holder and the busbar holder includes a hole portion recessed in the axial direction. Another one of the bearing holder and the busbar holder includes a fitting projection portion that projects in the axial direction. The fitting projection portion is fitted in the hole portion, and an axial dimension of a portion of the first central tubular portion which is fitted in the first central hole portion is greater than an axial dimension of a portion of the fitting projection portion which is fitted in the hole portion.

A motor according to another example embodiment of the present disclosure is a motor including a rotor including a shaft extending along a central axis, a stator including coils and radially opposite to the rotor with a gap therebetween, a bearing rotatably supporting the shaft, a bearing holder on a first axial side of the stator to hold the bearing, and a busbar unit on the first axial side of the bearing holder. The busbar unit includes a plurality of busbars electrically connected to the coils, and a busbar holder to hold the busbars and located on the first axial side of the bearing holder. Each of the plurality of busbars includes a grasping portion to grasp a conducting wire extending from one of the coils. The grasping portion includes a base portion, and a pair of arm portions extending from the base portion to a first circumferential side, and arranged radially opposite to each other with a radial gap therebetween. The conducting wire extending from the coil is inserted in the radial gap between the pair of arm portions. The pair of arm portions in each of the grasping portions of the plurality of busbars extend from the base portion to the same side in a circumferential direction. The bearing holder includes a bearing holder body, and a cylindrical second central tubular portion centered on the central axis, and projecting to the first axial side from the bearing holder body. The busbar holder includes a second central hole portion centered on the central axis, and extending through the busbar holder in an axial direction. The second central tubular portion is fitted in the second central hole portion. One of the bearing holder and the busbar holder includes a hole portion recessed in the axial direction. Another one of the bearing holder and the busbar holder includes a fitting projection portion that projects in the axial direction. The fitting projection portion is fitted in the hole portion. An axial dimension of a portion of the second central tubular portion which is fitted in the second central hole portion is greater than an axial dimension of a portion of the fitting projection portion which is fitted in the hole portion.

The above and other elements, features, steps, characteristics and advantages of the present disclosure will become more apparent from the following detailed description of the example embodiments with reference to the attached drawings.

DETAILED DESCRIPTION

A z-axis direction shown appropriately in the accompanying figures is a vertical direction with a positive side and a negative side being an upper side and a lower side, respectively. A central axis J shown appropriately in the accompanying figures is an imaginary line parallel to the z-axis direction and extending in the vertical direction. In the following description, an axial direction of the central axis J, i.e., a direction parallel to the vertical direction, is simply referred to by the term "axial direction", "axial", or "axially", radial directions centered on the central axis J are each simply referred to by the term "radial direction", "radial", or "radially", and a circumferential direction about the central axis J is simply referred to by the term "circumferential direction", "circumferential", or "circumferentially". The circumferential direction is appropriately indicated by an arrow θ in each figure.

The positive side in the z-axis direction in the axial direction is referred to as an "upper side", while the negative side in the z-axis direction in the axial direction is referred to as a "lower side". In the present example embodiment, the upper side corresponds to a first axial side, while the lower side corresponds to a second axial side. In addition, a counterclockwise side in the circumferential direction, i.e., a side to which the arrow θ points, when viewed from the upper side is referred to as a "first circumferential side". A clockwise side in the circumferential direction, i.e., a side opposite to the side to which the arrow θ points, when viewed from the upper side is referred to as a "second circumferential side".

Note that the vertical direction, the upper side, and the lower side have been defined simply to describe relative positions of different members or portions, and that an actual positional relationship may be different from a positional relationship which will be described using the above definitions of the vertical direction, the upper side, and the lower side.

Figure 1:
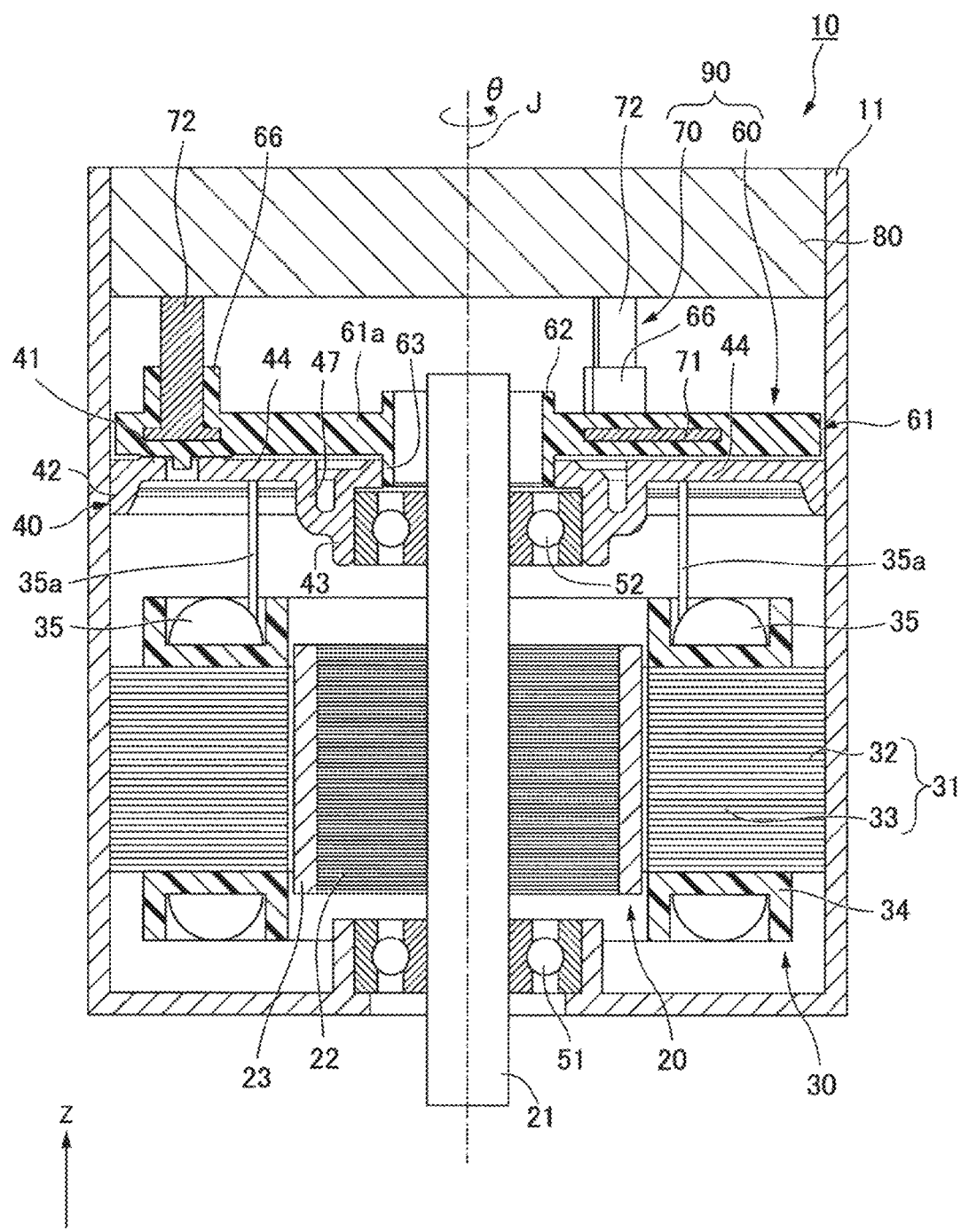
FIG. 1 is a sectional view illustrating a motor according to a first example embodiment of the present disclosure.
Figure 2:
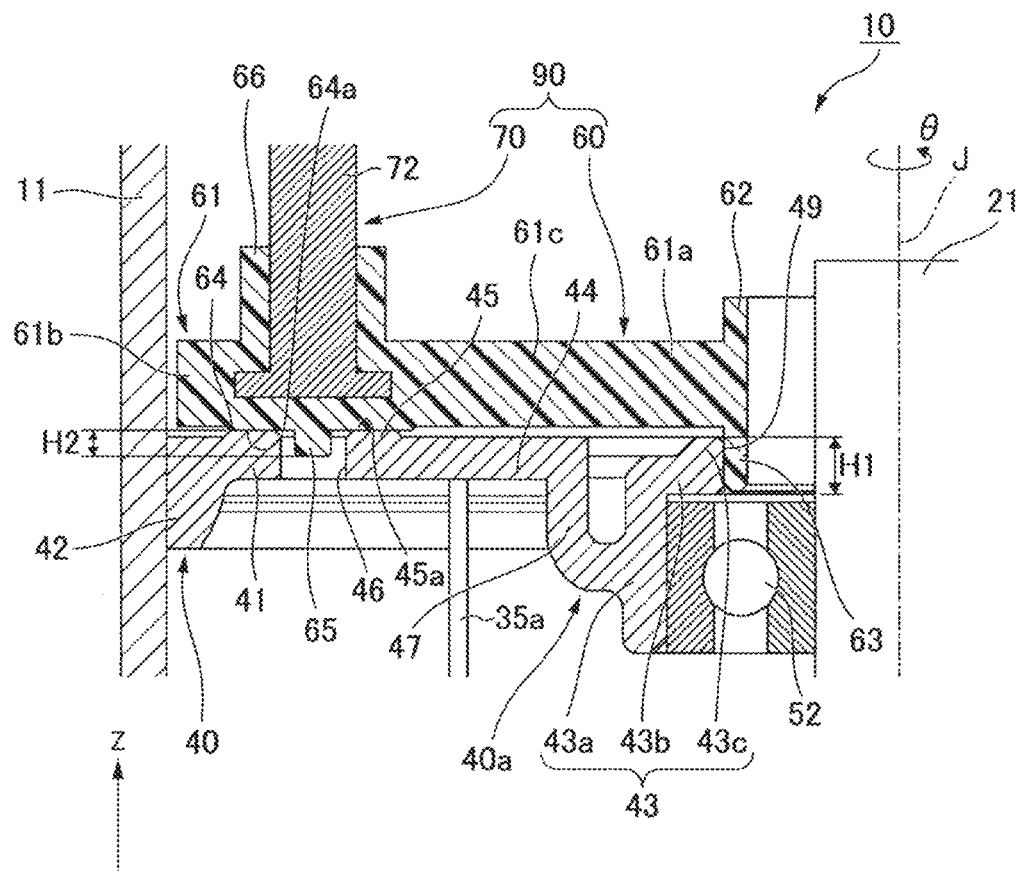
FIG. 2 is a sectional view illustrating a portion of the motor according to the first example embodiment of the present disclosure.

Referring to FIGS. 1 and 2, a motor 10 according to a first example embodiment of the present disclosure includes a housing 11, a rotor 20, bearings 51 and 52, a stator 30, a bearing holder 40, a busbar unit 90, and a control unit 80. Referring to FIG. 1, the housing 11 is arranged to house various portions of the motor 10. The housing 11 is cylindrical, and is centered on the central axis J. The housing 11 is arranged to hold the bearing 51 at a bottom portion thereof on the lower side.

The rotor 20 includes a shaft 21, a rotor core 22, and a magnet 23. The shaft 21 is arranged to extend along the central axis J. The shaft 21 is rotatably supported by the bearings 51 and 52. The rotor core 22 is annular, and is fixed to an outer circumferential surface of the shaft 21. The magnet 23 is fixed to an outer circumferential surface of the rotor core 22. The bearing 51 is arranged to rotatably support the shaft 21 on the lower side of the rotor core 22. The bearing 52 is arranged to rotatably support the shaft 21 on the upper side of the rotor core 22. Each of the bearings 51 and 52 is a ball bearing.

The stator 30 is arranged radially opposite to the rotor 20 with a gap therebetween. The stator 30 is arranged to surround the rotor 20 on a radially outer side of the rotor 20. The stator 30 includes a stator core 31, an insulator 34, and a plurality of coils 35. The stator core 31 includes a core back 32 and a plurality of teeth 33.

Each of the coils 35 is attached to a separate one of the teeth 33 with a portion of the insulator 34 therebetween. Each coil 35 is defined by a conducting wire wound around the corresponding tooth 33 with a portion of the insulator 34 therebetween. A coil lead wire 35a is drawn to the upper side from each coil 35. The coil lead wire 35a is a conducting wire extending from the coil 35, and is an end portion of the conducting wire defining the coil 35.

Figure 3:
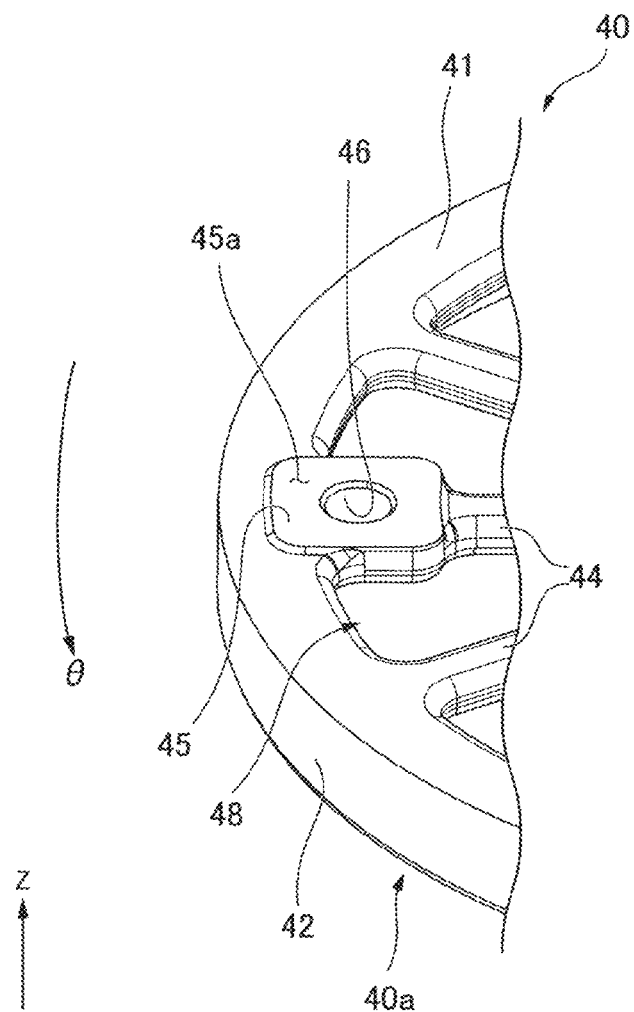
FIG. 3 is a perspective view illustrating a portion of a bearing holder according to the first example embodiment of the present disclosure.

The bearing holder 40 is arranged on the upper side of the stator 30. The bearing holder 40 is made of a metal. The bearing holder 40 is arranged to hold the bearing 52. Referring to FIGS. 2 and 3, the bearing holder 40 includes a first outer annular portion 41, a tubular fixing portion 42, a first inner annular portion 47, a plurality of first connection portions 44, a bearing holding portion 43, and first projecting portions 45. The first outer annular portion 41 is in the shape of an annular plate, being centered on the central axis J, and having principal surfaces perpendicular to the axial direction. The tubular fixing portion 42 is cylindrical, and is arranged to extend downward from a radially outer edge portion of the first outer annular portion 41. Referring to FIG. 1, an outer circumferential surface of the first outer annular portion 41 and an outer circumferential surface of the tubular fixing portion 42 are fixed to an inner circumferential surface of the housing 11. The first inner annular portion 47 is cylindrical, and is centered on the central axis J. The first inner annular portion 47 is arranged radially inward of the first outer annular portion 41. A lower end portion of the first inner annular portion 47 is curved radially inward.

Referring to FIGS. 2 and 3, each of the first connection portions 44 is arranged to extend in a radial direction. The first connection portions 44 are arranged at regular intervals in the circumferential direction all the way around the central axis J. The number of first connection portions 44 is, for example, twelve. Each of the first connection portions 44 is arranged to join a radially inner edge portion of the first outer annular portion 41 and an upper end portion of the first inner annular portion 47 to each other.

At least one of the first connection portions 44 includes a radially outer portion having an increased circumferential width. For example, three of the first connection portions 44 include such a radially outer portion having an increased circumferential width. These three first connection portions 44 are arranged at regular intervals in the circumferential direction all the way around the central axis J. A first through hole 48 is defined between every pair of first connection portions 44 circumferentially adjacent to each other. The first through hole 48 is arranged to pass through the bearing holder 40 in the axial direction. The coil lead wire 35a extending from each coil 35 is passed through the corresponding first through hole 48.

Referring to FIG. 2, the bearing holding portion 43 is joined to a radially inner edge portion of the lower end portion of the first inner annular portion 47. The bearing holding portion 43 includes a tubular portion 43a, a cover portion 43b, and an annular projecting portion 43c. The tubular portion 43a is cylindrical, and is centered on the central axis J. An outer circumferential surface of the bearing 52 is fixed to an inner circumferential surface of the tubular portion 43a. The bearing holding portion 43 thus holds the bearing 52. The bearing 52 is arranged apart from the cover portion 43b to the lower side.

The cover portion 43b is annular, and is arranged to project radially inward from an upper end portion of the tubular portion 43a. The cover portion 43b is arranged to cover an upper side of an outer race of the bearing 52. The annular projecting portion 43c is arranged to project upward from a radially inner edge portion of the cover portion 43b. The annular projecting portion 43c is annular, and is centered on the central axis J. An inner circumferential surface of the annular projecting portion 43c is joined to an upper end portion of an inner circumferential surface of the cover portion 43b. The inner circumferential surface of the annular projecting portion 43c and the inner circumferential surface of the cover portion 43b are arranged at the same position in the radial directions.

In the present example embodiment, the cover portion 43b and the annular projecting portion 43c together define a first central hole portion 49 arranged to pass through the bearing holder 40 in the axial direction. That is, the bearing holder 40 includes the first central hole portion 49. A wall surface of the first central hole portion 49 is defined by the inner circumferential surface of the cover portion 43b and the inner circumferential surface of the annular projecting portion 43c. The first central hole portion 49 is circular and is centered on the central axis J when viewed along the axial direction.

In the present example embodiment, the first outer annular portion 41, the tubular fixing portion 42, the first inner annular portion 47, the first connection portions 44, and the bearing holding portion 43 together define a bearing holder body 40a. That is, the bearing holder 40 includes the bearing holder body 40a.

Referring to FIGS. 2 and 3, each first projecting portion 45 is arranged to project upward from the bearing holder body 40a. The first projecting portion 45 is arranged to extend over the first outer annular portion 41 and the corresponding first connection portion 44. The first projecting portion 45 is arranged at each of the first connection portions 44 which include the aforementioned radially outer portion having the increased circumferential width. That is, in the present example embodiment, the number of first projecting portions 45 is three, and the first projecting portions 45 are arranged at regular intervals in the circumferential direction all the way around the central axis J.

An upper surface of each first projecting portion 45 is a lower contact surface 45a. The lower contact surface 45a is a flat surface perpendicular to the axial direction. The lower contact surface 45a is substantially in the shape of a square with rounded corners when viewed from the upper side. The lower contact surface 45a is an uppermost portion of the bearing holder 40.

One of the first projecting portions 45 includes a hole portion 46 recessed in the axial direction. That is, the bearing holder 40 includes the hole portion 46. The hole portion 46 is recessed downward from the lower contact surface 45a. That is, the hole portion 46 is open in the upper surface of the first projecting portion 45. The hole portion 46 is circular when viewed from the upper side. The hole portion 46 is arranged in a center of the first projecting portion 45. Referring to FIG. 2, the hole portion 46 passes through the bearing holder 40 in the axial direction from the lower contact surface 45a to a lower surface of the corresponding first connection portion 44.

Figure 4:
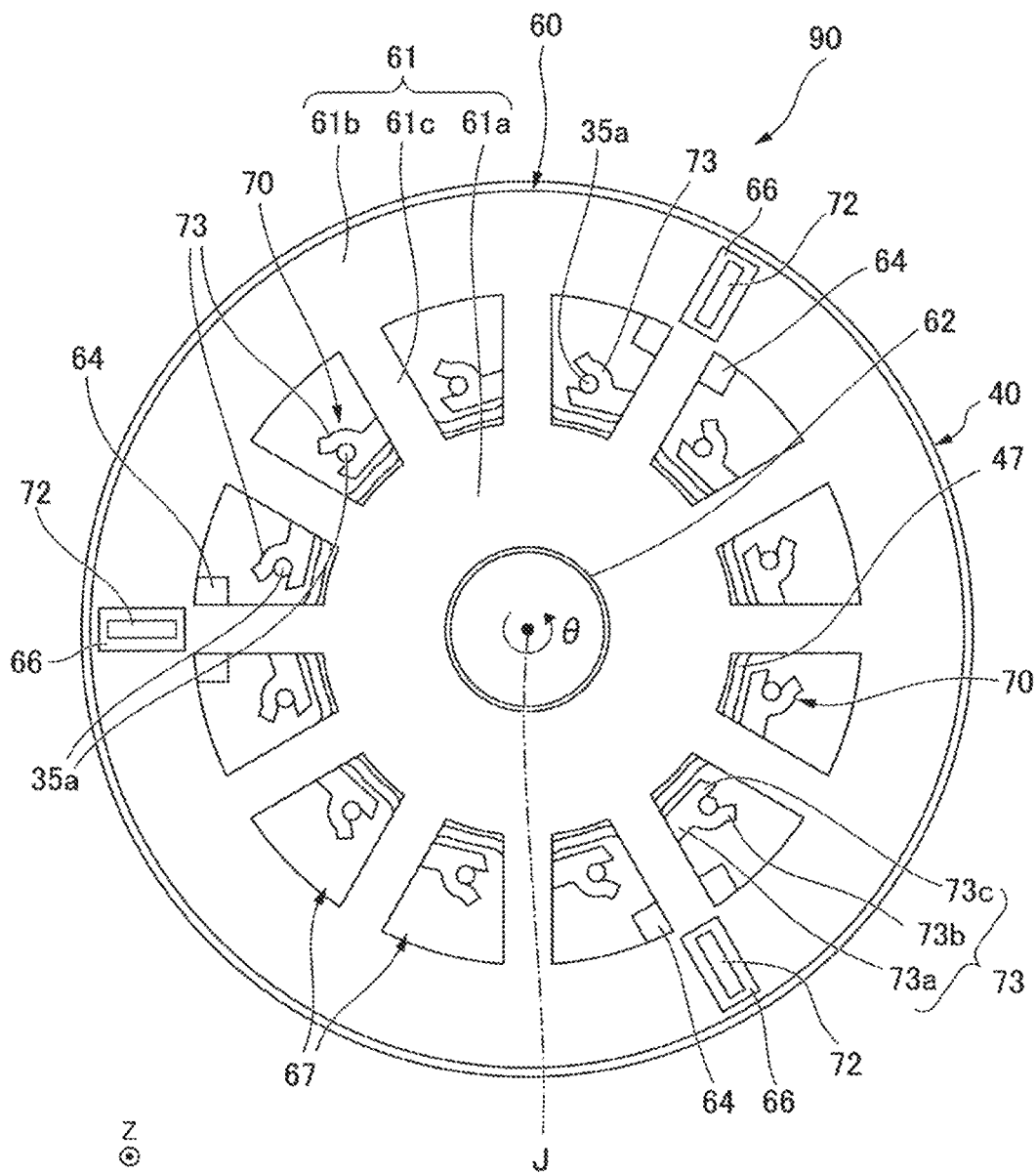
FIG. 4 is a diagram illustrating a busbar unit and the bearing holder according to the first example embodiment of the present disclosure as viewed from an upper side.
Figure 5:
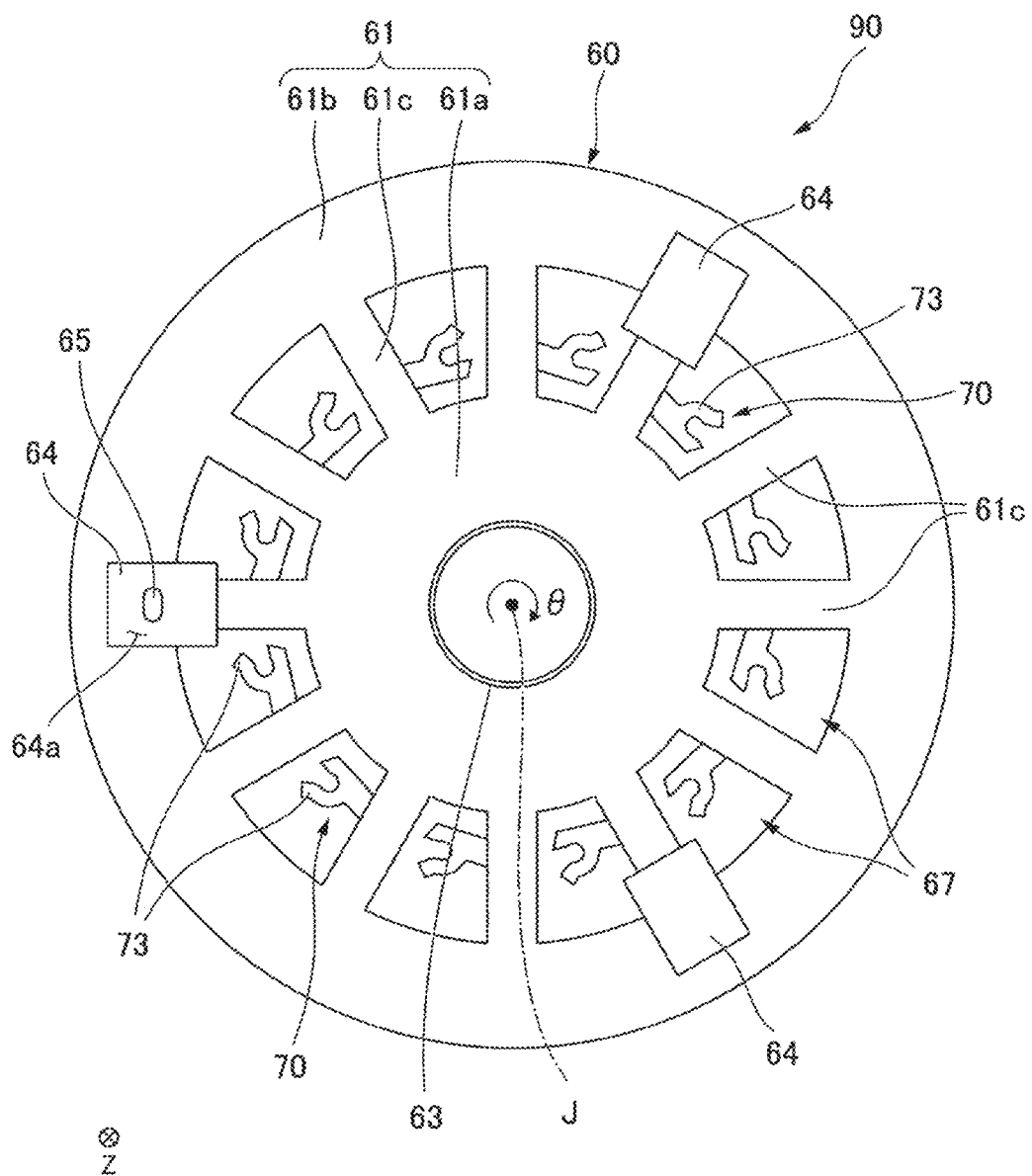
FIG. 5 is a diagram illustrating the busbar unit according to the first example embodiment of the present disclosure as viewed from a lower side.

Referring to FIG. 1, the busbar unit 90 is arranged on the upper side of the bearing holder 40. The busbar unit 90 includes a plurality of busbars 70 and a busbar holder 60. The busbar holder 60 is made of a resin. Referring to FIGS. 4 and 5, the busbar holder 60 includes a busbar holder body 61, an upper central tubular portion 62, a lower central tubular portion 63, second projecting portions 64, a fitting projection portion 65, and terminal support portions 66.

The busbar holder body 61 includes a second inner annular portion 61a, a second outer annular portion 61b, and a plurality of second connection portions 61c. Each of the second inner annular portion 61a and the second outer annular portion 61b is annular, and is centered on the central axis J. The second outer annular portion 61b is arranged to surround the second inner annular portion 61a on a radially outer side of the second inner annular portion 61a when viewed along the axial direction. Referring to FIG. 2, the second inner annular portion 61a is arranged on the upper side of the bearing holding portion 43. The second outer annular portion 61b is arranged on the upper side of the first outer annular portion 41. In the present example embodiment, the second inner annular portion 61a and the second outer annular portion 61b are arranged at the same position in the axial direction. The second outer annular portion 61b is arranged to have an outside diameter smaller than an outside diameter of the bearing holder 40.

Referring to FIG. 4, each of the second connection portions 61c is arranged to extend in a radial direction. The second connection portions 61c are arranged at regular intervals in the circumferential direction all the way around the central axis J. In FIG. 4, the number of second connection portions 61c is, for example, twelve. Each of the second connection portions 61c is arranged to join the second outer annular portion 61b and the second inner annular portion 61a to each other. More specifically, each of the second connection portions 61c is arranged to join a radially inner edge portion of the second outer annular portion 61b and a radially outer edge portion of the second inner annular portion 61a to each other. The second connection portions 61c are arranged to overlap with the first connection portions 44 when viewed along the axial direction. A second through hole 67 is defined between every pair of second connection portions 61c circumferentially adjacent to each other. The second through hole 67 is arranged to pass through the busbar holder 60 in the axial direction. Each second through hole 67 is arranged to overlap with the corresponding first through hole 48 when viewed along the axial direction. In each second through hole 67, the coil lead wire 35a extending upward through the corresponding first through hole 48 is inserted.

Referring to FIG. 1, the upper central tubular portion 62 is cylindrical, centered on the central axis J, and is arranged to project upward from a radially inner edge portion of the second inner annular portion 61a. The lower central tubular portion 63 is cylindrical, centered on the central axis J, and is arranged to project downward from the radially inner edge portion of the second inner annular portion 61a. That is, the lower central tubular portion 63 is cylindrical, centered on the central axis J, and is arranged to project downward from the busbar holder body 61.

A space inside of the upper central tubular portion 62 and a space inside of the lower central tubular portion 63 are joined to each other in the axial direction, and are arranged to pass through the busbar holder 60 in the axial direction.

An upper end portion of the shaft 21 are arranged to pass through the space inside of the upper central tubular portion 62 and the space inside of the lower central tubular portion 63.

A lower end portion of the lower central tubular portion 63 is a lowermost portion of the busbar unit 90. Referring to FIG. 2, the lower central tubular portion 63 is fitted in the first central hole portion 49. The lower end portion of the lower central tubular portion 63 is arranged opposite to the bearing 52 with a gap therebetween on the upper side of the bearing 52. The lower end portion of the lower central tubular portion 63 is arranged at substantially the same position in the axial direction as a lower end portion of the first central hole portion 49. In the present example embodiment, the lower central tubular portion 63 corresponds to a first central tubular portion.

Figure 6:
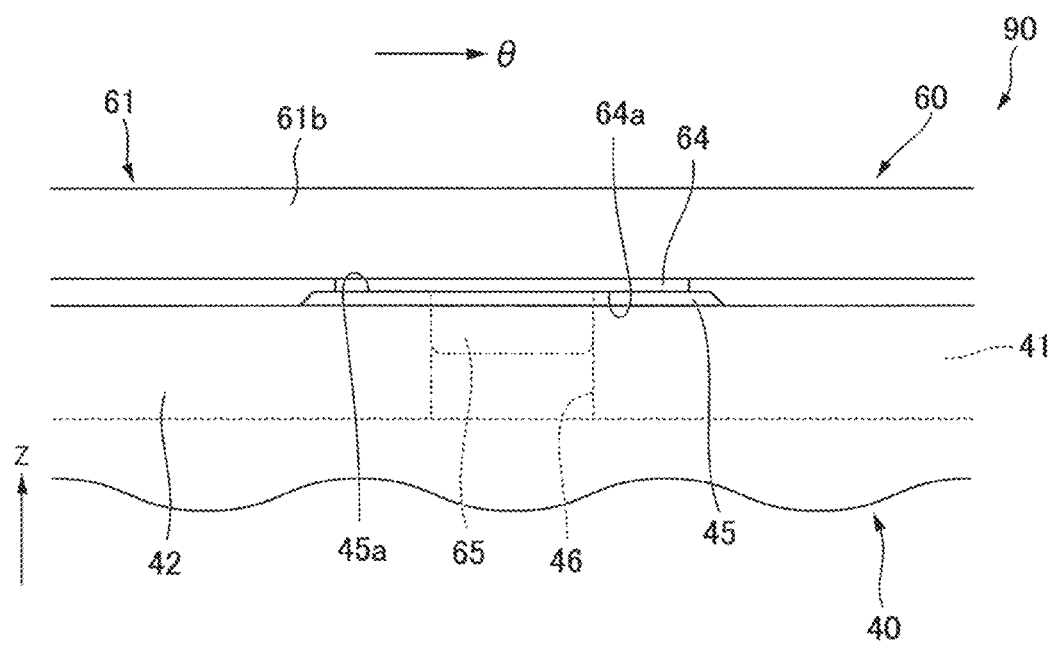
FIG. 6 is a diagram illustrating a portion of the busbar unit and a portion of the bearing holder according to the first example embodiment of the present disclosure as viewed from radially outside.

Each second projecting portion 64 is arranged to project downward from the busbar holder body 61. Referring to FIG. 5, the second projecting portion 64 is arranged to extend over the second outer annular portion 61b and the corresponding second connection portion 61c. The number of second projecting portions 64 is more than one. The second projecting portions 64 are arranged at regular intervals in the circumferential direction all the way around the central axis J. In FIG. 5, the number of second projecting portions 64 is, for example, three. Referring to FIG. 6, each first projecting portion 45 and the corresponding second projecting portion 64 are arranged to overlap with each other when viewed along the axial direction.

A lower surface of each second projecting portion 64 is an upper contact surface 64a. The upper contact surface 64a is a flat surface perpendicular to the axial direction. Referring to FIG. 2, the upper contact surface 64a is arranged on the upper side relative to the lower end portion of the lower central tubular portion 63. Referring to FIG. 5, the upper contact surface 64a is rectangular, elongated in a radial direction, when viewed from the lower side. Referring to FIG. 6, the lower contact surface 45a of each first projecting portion 45 and the upper contact surface 64a of the corresponding second projecting portion 64 are arranged to be in contact with each other. The busbar unit 90 is thus axially positioned with respect to the bearing holder 40.

In the present example embodiment, a reduction in the likelihood that the busbar unit 90 will be arranged at an angle with respect to the bearing holder 40 can be achieved because each of the lower contact surfaces 45a and the upper contact surfaces 64a is a flat surface perpendicular to the axial direction. In addition, the busbar unit 90 can be stably supported by the bearing holder 40.

The fitting projection portion 65 is arranged at one of the second projecting portions 64. The fitting projection portion 65 is columnar, and is arranged to project downward from the upper contact surface 64a thereof. Referring to FIG. 5, the fitting projection portion 65 is in the shape of a rectangle with rounded corners, elongated in a direction perpendicular to both the radial direction and the axial direction, when viewed from the lower side. A lower surface of the fitting projection portion 65 is a flat surface perpendicular to the axial direction. Referring to FIG. 6, the fitting projection portion 65 is fitted in the hole portion 46. The busbar unit 90 is thus circumferentially positioned with respect to the bearing holder 40, preventing the busbar unit 90 and the bearing holder 40 from being circumferentially displaced relative to each other.

Of dimensions of the fitting projection portion 65 in directions perpendicular to the axial direction, the dimension thereof in the longitudinal direction is substantially equal to a diameter of the hole portion 46, and is slightly smaller than the diameter of the hole portion 46. The longitudinal direction of the fitting projection portion 65 is a left-right direction in FIG. 6.

A lower end portion of the fitting projection portion 65 is arranged on the upper side relative to a lower end portion of the hole portion 46. Referring to FIG. 2, the lower end portion of the fitting projection portion 65 is arranged on the upper side relative to the lower end portion of the lower central tubular portion 63. An axial dimension H2 of a portion of the fitting projection portion 65 which is fitted in the hole portion 46 is smaller than an axial dimension H1 of a portion of the lower central tubular portion 63 which is fitted in the first central hole portion 49. The dimension H1 corresponds to an axial distance between an upper end portion of the first central hole portion 49 and the lower end portion of the lower central tubular portion 63. The dimension H2 corresponds to an axial distance between an upper end portion of the hole portion 46 and the lower end portion of the fitting projection portion 65. In the present example embodiment, the fitting projection portion 65 is entirely fitted in the hole portion 46. Accordingly, the dimension H2 corresponds to an axial dimension of the fitting projection portion 65.

Each terminal support portion 66 is arranged to project upward from the busbar holder body 61. More specifically, the terminal support portion 66 is arranged to project upward from the second outer annular portion 61b. The terminal support portion 66 is in the shape of a rectangular parallelepiped. Referring to FIG. 4, the number of terminal support portions 66 is more than one. The terminal support portions 66 are arranged at regular intervals in the circumferential direction all the way around the central axis J. In FIG. 4, the number of terminal support portions 66 is, for example, three. Each of the three terminal support portions 66 is arranged to overlap with a separate one of the three second projecting portions 64 when viewed along the axial direction.

Referring to FIGS. 1 and 4, each of the busbars 70 includes a busbar body 71, a connection terminal 72, and grasping portions 73. In the present example embodiment, the number of busbars 70 is, for example, three. Each of the three busbars 70 includes one connection terminal 72 and four grasping portions 73. That is, in the present example embodiment, a total of three connection terminals 72 and a total of twelve grasping portions 73 are provided.

Referring to FIG. 1, each busbar body 71 is buried in the busbar holder 60. The busbar holder 60 thus holds the busbars 70. The busbar body 71 is in the shape of a plate, including principal surfaces perpendicular to the axial direction. The busbar body 71 is arranged to extend along a plane perpendicular to the axial direction. The connection terminal 72 is joined to the busbar body 71. The connection terminal 72 is arranged to project upward from the busbar holder 60. More specifically, the connection terminal 72 is arranged to project upward from the corresponding terminal support portion 66. A lower portion of the connection terminal 72 is supported by the terminal support portion 66. An upper end portion of the connection terminal 72 is connected to the control unit 80. Referring to FIG. 4, the connection terminals 72 of the three busbars 70 are arranged at regular intervals in the circumferential direction all the way around the central axis J.

Each grasping portion 73 is in the shape of a plate, including principal surfaces perpendicular to the axial direction. The grasping portion 73 is connected to the corresponding busbar body 71, and is arranged to project to the first circumferential side from the corresponding second connection portion 61c to be exposed to a space outside of the busbar holder 60. The grasping portion 73 is arranged in the corresponding second through hole 67. The grasping portion 73 is substantially in the shape of the letter "U", opening to the first circumferential side. The grasping portion 73 includes a base portion 73a and a pair of arm portions 73b and 73c.

The base portion 73a is a portion joined to the corresponding busbar body 71, and is arranged to project to the first circumferential side from the corresponding second connection portion 61c. The pair of arm portions 73b and 73c are arranged to extend from the base portion 73a to the first circumferential side. The arm portion 73b and the arm portion 73c are arranged radially opposite to each other with a radial gap therebetween. The arm portion 73b is wavy when viewed along the axial direction. An upper end portion of the corresponding coil lead wire 35a is inserted in an inside of the grasping portion 73, i.e., in the radial gap between the arm portion 73b and the arm portion 73c.

Although not illustrated in the figures, distal end portions of the pair of arm portions 73b and 73c of each grasping portion 73 are crimped from both sides in a radial direction to hold the corresponding coil lead wire 35a from both sides in the radial direction. The grasping portion 73 thus grasps the coil lead wire 35a. The grasping portion 73 and the coil lead wire 35a are fixed to each other through, for example, welding. Each grasping portion 73 is thus connected to the corresponding coil lead wire 35a, and each busbar 70 is electrically connected to the corresponding coils 35.

The pair of arm portions 73b and 73c in each of the grasping portions 73 of the busbars 70 are arranged to extend from the base portion 73a to the same side in the circumferential direction. Thus, each of the grasping portions 73 opens to the same side in the circumferential direction.

Although the grasping portions 73 illustrated in the accompanying figures are open to the first circumferential side, the distal end portion of the arm portion 73b and the distal end portion of the arm portion 73c may be in contact with each other as a result of the aforementioned crimping of the arm portions 73b and 73c. In this case, an opening of the grasping portion 73 is closed.

Referring to FIG. 1, the control unit 80 is arranged on the upper side of the busbar unit 90. The control unit 80 is electrically connected to the busbars 70 through the connection terminals 72. The control unit 80 is arranged to supply power to the coils 35 through the busbars 70. The control unit 80 includes a board on which an inverter circuit to control supply of power to the coils 35 is arranged, and so on.

Figure 7:
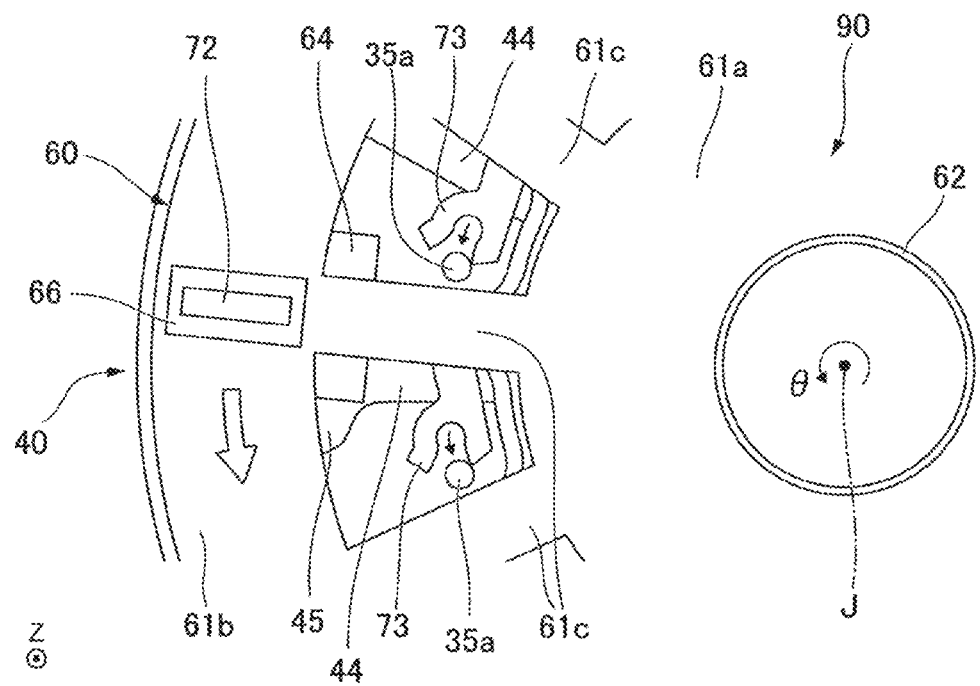
FIG. 7 is a diagram illustrating a portion of a fitting process for the busbar unit according to the first example embodiment of the present disclosure.
Figure 8:
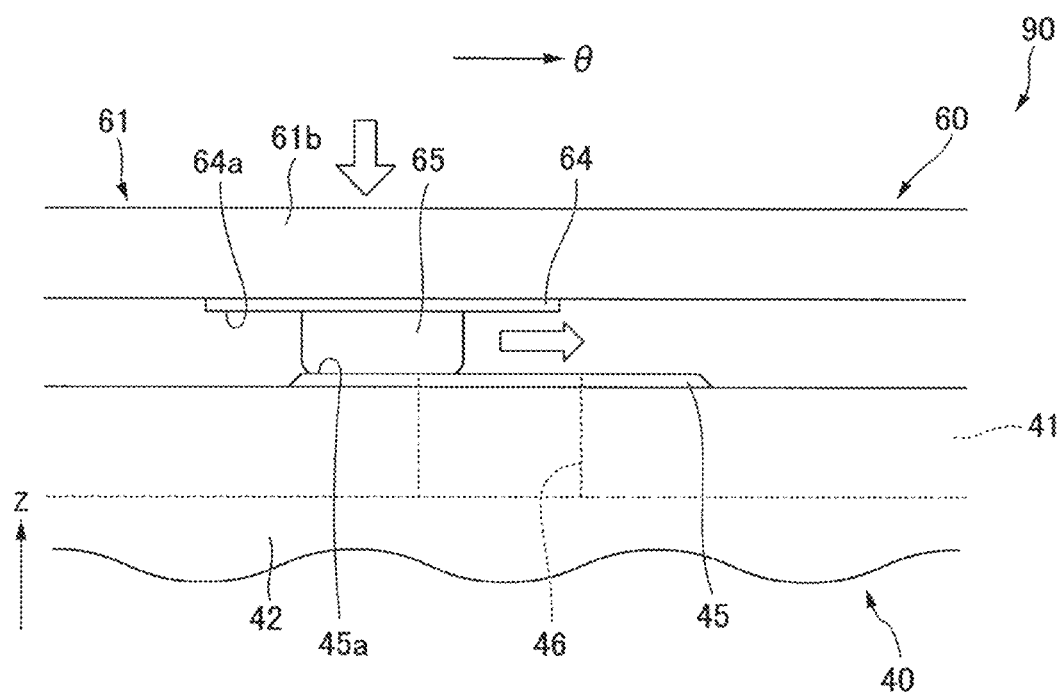
FIG. 8 is a diagram illustrating a portion of the fitting process for the busbar unit according to the first example embodiment of the present disclosure.

Referring to FIG. 7, an operator who fits the busbar unit 90 to the bearing holder 40 roughly positions the busbar unit such that the busbar unit 90 is slightly displaced to a circumferential side opposite to the circumferential side to which each grasping portion 73 is open, i.e., to the second circumferential side, with respect to the bearing holder 40. Then, referring to FIG. 8, the operator brings the busbar unit 90 closer to the bearing holder 40 from the upper side to bring the lower surface of the fitting projection portion 65 into contact with the lower contact surface 45a. At this time, the coil lead wire 35a extending to the upper side through each first through hole 48 is inserted into the corresponding second through hole 67 to be located circumferentially opposite to the corresponding grasping portion 73.

In addition, the axial dimension H1 of the portion of the lower central tubular portion 63 which is fitted in the first central hole portion 49 is greater than the axial dimension H2 of the portion of the fitting projection portion 65 which is fitted in the hole portion 46. Accordingly, when the lower surface of the fitting projection portion 65 has been brought into contact with the lower contact surface 45a, in which the hole portion 46 is open, the lower end portion of the lower central tubular portion 63 is in a state of being fitted in the first central hole portion 49. Thus, with the lower central tubular portion 63 being fitted in the first central hole portion 49, the busbar unit 90 is in a state of being supported to be rotatable about the central axis J with respect to the bearing holder 40.

Next, the operator turns the busbar unit 90 in the circumferential direction while applying a downward force to the busbar unit 90. More specifically, referring to FIG. 7, the operator turns the busbar unit 90 in the circumferential direction to the side to which each grasping portion 73 is open, i.e., to the first circumferential side. Thus, referring to FIG. 8, the lower surface of the fitting projection portion 65 slides in the circumferential direction along the lower contact surface 45a. Then, when the fitting projection portion 65 has reached a position that overlaps with the hole portion 46 when viewed in the axial direction, the fitting projection portion 65 is fitted into the hole portion 46, and the busbar unit 90 moves downward until the upper contact surface 64a comes into contact with the lower contact surface 45a.

In the above-described manner, the operator is able to fit the busbar unit 90 to the bearing holder 40, axially and circumferentially positioning the busbar unit 90 with respect to the bearing holder 40. The circumferential positioning of the busbar unit 90 with respect to the bearing holder 40 achieves circumferential positioning of the connection terminals 72. This facilitates connection of the connection terminals 72 to the control unit 80. In addition, when the busbar unit 90 has been circumferentially positioned with respect to the bearing holder 40, each coil lead wire 35a has been inserted into the inside of the corresponding grasping portion 73 through the opening of the grasping portion 73. Each coil lead wire 35a can thus be moved to a suitable position to be connected to the corresponding busbar 70.

As described above, according to the present example embodiment, since the dimension H1 is greater than the dimension H2, the lower central tubular portion 63 is fitted into the first central hole portion 49 before the fitting projection portion 65 is fitted into the hole portion 46. Accordingly, it is possible to turn the busbar unit 90 using the lower central tubular portion 63 as a pivot when the fitting projection portion 65 is not yet fitted in the hole portion 46. Thus, the operator is able to insert each coil lead wire 35a into the inside of the corresponding grasping portion 73 by, when each coil lead wire 35a is located at a position circumferentially displaced from the corresponding grasping portion 73, turning the busbar unit 90 until the fitting projection portion 65 is fitted into the hole portion 46.

In addition, since the arm portions 73b and 73c in each of the grasping portions 73 extend from the base portion 73a to the same side in the circumferential direction, each grasping portion 73 is open to the same side in the circumferential direction before the corresponding coil lead wire 35a is fixed therein. Thus, it is possible to insert each of the coil lead wires 35a into the inside of the corresponding one of the grasping portions 73 by turning the busbar unit 90 in one direction.

Here, when the busbar unit 90 is brought closer to the bearing holder 40, each coil lead wire 35a may be inserted into a portion of the corresponding second through hole 67 which lies on the first circumferential side of the corresponding grasping portion 73, i.e., a portion of the corresponding second through hole 67 which is larger than the inside of the grasping portion 73. Accordingly, a greater circumferential displacement of the busbar unit 90 is permitted than in the case where the busbar unit 90 should be positioned at such a position that each coil lead wire 35a can be directly inserted into the inside of the corresponding grasping portion 73. Thus, the positioning of the busbar unit 90 when the busbar unit 90 is brought closer to the bearing holder 40 is facilitated. In addition, even if any coil lead wire 35a is displaced, it is easy to insert the coil lead wire 35a into a desired position, i.e., a position circumferentially displaced from the corresponding grasping portion 73 within the corresponding second through hole 67.

As described above, the operator only needs to bring the busbar unit 90 closer to the bearing holder 40 after relatively roughly circumferentially positioning the busbar unit 90 with respect to the bearing holder 40. After that, the operator is able to circumferentially position the busbar unit 90 structurally by fitting the fitting projection portion 65 into the hole portion 46. Therefore, according to the present example embodiment, it is easy to insert each coil lead wire 35a into the corresponding grasping portion 73, which makes it easy to connect each coil lead wire 35a to the corresponding busbar 70.

As the size of the motor 10 decreases, the inside of each grasping portion 73 becomes smaller. Accordingly, as the size of the motor 10 decreases, it becomes more difficult to directly insert each coil lead wire 35a into the corresponding grasping portion 73 by bringing the busbar unit 90 closer to the bearing holder 40. Therefore, the aforementioned advantageous effect of facilitating the insertion of each coil lead wire 35a into the corresponding grasping portion 73 is particularly useful in relatively small motors.

In the present example embodiment, the hole portion 46 is included in the bearing holder 40, while the fitting projection portion 65 is included in the busbar holder 60. Accordingly, a sufficient strength of the busbar holder 60 can be more easily achieved than in the case where the hole portion is included in the busbar holder 60.

In the present example embodiment, the upper surface of each first projecting portion 45 is the lower contact surface 45a, which is a flat surface, and the hole portion 46 is open in one of the lower contact surfaces 45a. Accordingly, it is possible to fit the fitting projection portion 65 into the hole portion 46 by sliding the fitting projection portion 65 along the lower contact surface 45a while pressing the fitting projection portion 65 onto the lower contact surface 45a. Thus, it is easy to fit the fitting projection portion 65 into the hole portion 46 when the busbar unit 90 is turned. In addition, a reduction in friction between the fitting projection portion 65 and the bearing holder 40 can be easily achieved to facilitate the turning of the busbar unit 90 in the circumferential direction. Moreover, a reduction in the likelihood of damage to the fitting projection portion 65 can be achieved.

In addition, in the present example embodiment, the lower surface of the fitting projection portion 65 is a flat surface perpendicular to the axial direction. Accordingly, the contact between the fitting projection portion 65 and the lower contact surface 45a is stable when the fitting projection portion 65 is pressed onto the lower contact surface 45a. This makes it easier to stably turn the busbar unit 90 with respect to the bearing holder 40.

Furthermore, in the present example embodiment, the lower end portion of the lower central tubular portion 63 is arranged on the lower side relative to the fitting projection portion 65. This makes it easier to increase the axial dimension of the lower central tubular portion 63, and increase the axial dimension H1 of the portion of the lower central tubular portion 63 which is fitted. This in turn makes it easier for the busbar unit 90 to be stably supported to be rotatable with the lower central tubular portion 63 being fitted in the first central hole portion 49.

Furthermore, in the present example embodiment, the annular projecting portion 43c, which defines a portion of the wall surface of the first central hole portion 49, is provided. This makes it easier to increase the axial dimension of the first central hole portion 49. This in turn makes it easier to further increase the axial dimension H1 of the portion of the lower central tubular portion 63 which is fitted therein.

Furthermore, in the present example embodiment, the bearing 52 is arranged apart from the cover portion 43b to the lower side. This makes it easier to arrange the bearing 52 to be apart from the lower central tubular portion 63, which is fitted in the first central hole portion 49, to the lower side. Accordingly, even if the axial dimension of the lower central tubular portion 63 is increased as mentioned above, the likelihood of a contact of the lower end portion of the lower central tubular portion 63 with the bearing 52 can be limited.

Figure 9:
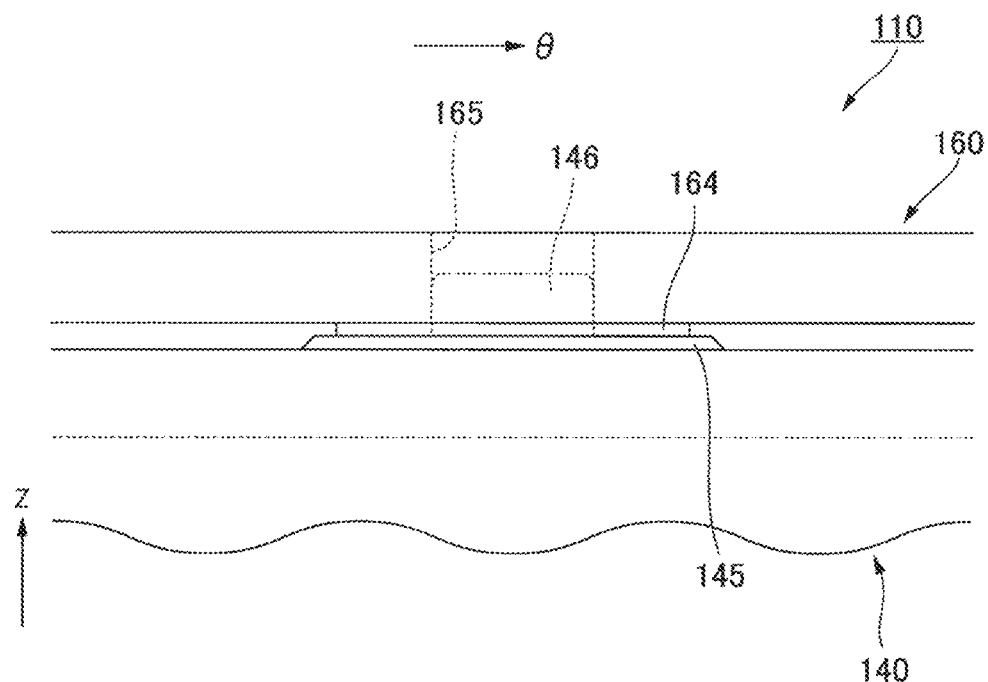
FIG. 9 is a diagram illustrating a portion of a busbar unit and a portion of a bearing holder according to a second example embodiment of the present disclosure as viewed from radially outside.

Referring to FIG. 9, in a motor 110 according to a second example embodiment of the present disclosure, a bearing holder 140 includes a fitting projection portion 146. The fitting projection portion 146 is arranged to project upward from a first projecting portion 145. A busbar holder 160 includes a hole portion 165. The hole portion 165 is arranged to open in a lower surface of a second projecting portion 164. The hole portion 165 is recessed upward from the lower surface of the second projecting portion 164. The hole portion 165 is arranged to pass through the busbar holder 160 in the axial direction. The fitting projection portion 146 is fitted in the hole portion 165.

As described above, in the present example embodiment, the hole portion 165 is included in the busbar holder 160, while the fitting projection portion 146 is included in the bearing holder 140. Accordingly, a sufficient strength of the bearing holder 140 can be more easily achieved than in the case where the hole portion is included in the bearing holder 140.

The present disclosure is not limited to the above-described example embodiments, and other configurations as described below may be adopted. In the above-described example embodiment, the busbar holder 60 includes the lower central tubular portion 63 as the first central tubular portion while the bearing holder 40 includes the first central hole portion 49, but this is not essential to the present disclosure. For example, the busbar holder and the bearing holder may alternatively be arranged to include, respectively, a second central hole portion centered on the central axis J and arranged to pass through the busbar holder in the axial direction, and a cylindrical second central tubular portion centered on the central axis J and arranged to project upward from the bearing holder body. In the case of this arrangement, the busbar unit is supported to be rotatable with respect to the bearing holder with the second central tubular portion being fitted in the second central hole portion. An axial dimension of a portion of the second central tubular portion which is fitted in the second central hole portion is arranged to be greater than an axial dimension of a portion of the fitting projection portion which is fitted in the hole portion.

The hole portion may alternatively be a hole having a bottom. A plurality of hole portions may alternatively be provided. In this case, the fitting projection portion may be provided for each of the hole portions, or the fitting projection portion(s) may be provided for only some and not all of the hole portions. The number of first projecting portions and the number of second projecting portions are not limited to particular values. The first projecting portions and the second projecting portions may not be provided. The number of connection terminals is not limited to particular values. The number of busbars and the number of grasping portions should be two or more, but are not limited to particular values. The bearing may alternatively be arranged to be in contact with the cover portion of the bearing holding portion. The bearing holding portion may not include the annular projecting portion.

Note that each of the motors according to the above-described example embodiments may be used for any desired purpose. Also note that features described above may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor including a shaft extending along a central axis;
a stator including coils and radially opposite to the rotor with a gap therebetween;
a bearing rotatably supporting the shaft;
a bearing holder on a first axial side of the stator to hold the bearing; and
a busbar unit on the first axial side of the bearing holder; wherein
the busbar unit includes a plurality of busbars electrically connected to the coils, and a busbar holder to hold the busbars and located on the first axial side of the bearing holder;
each of the plurality of busbars includes a grasping portion to grasp a conducting wire extending from one of the coils;
the grasping portion includes a base portion, and a pair of arm portions extending from the base portion to a first circumferential side, and radially opposite to each other with a radial gap therebetween;
the conducting wire extending from the coil is located in the radial gap between the pair of arm portions;
the pair of arm portions in each of the grasping portions of the plurality of busbars extend from the base portion to a same side in a circumferential direction;
the busbar holder includes a busbar holder body, and a cylindrical first central tubular portion centered on the central axis, and projects to a second axial side from the busbar holder body;
the bearing holder includes a first central hole portion centered on the central axis, and extending through the bearing holder in an axial direction;
the first central tubular portion is fitted in the first central hole portion;
one of the bearing holder and the busbar holder includes a hole portion recessed in the axial direction;
another one of the bearing holder and the busbar holder includes a fitting projection portion projecting in the axial direction; and
the fitting projection portion is fitted in the hole portion, and an axial dimension of a portion of the first central tubular portion which is fitted in the first central hole portion is greater than an axial dimension of a portion of the fitting projection portion which is fitted in the hole portion.

2. The motor according to claim 1, wherein
the hole portion is included in the bearing holder, and is recessed to the second axial side; and
the fitting projection portion is included in the busbar holder and projects to the second axial side.

3. The motor according to claim 2, wherein
the bearing holder includes a bearing holder body, and a first projecting portion projecting to the first axial side from the bearing holder body;
a surface of the first projecting portion on the first axial side is a flat surface perpendicular or substantially perpendicular to the axial direction; and
the hole portion is open in the surface of the first projecting portion on the first axial side.

4. The motor according to claim 3, wherein a surface of the fitting projection portion on the second axial side is a flat surface perpendicular or substantially perpendicular to the axial direction.

5. The motor according to claim 3, wherein
the busbar holder includes a second projecting portion projecting to the second axial side from the busbar holder body;
a surface of the second projecting portion on the second axial side is a flat surface perpendicular or substantially perpendicular to the axial direction;
the fitting projection portion projects to the second axial side from the surface of the second projecting portion on the second axial side; and
the surface of the first projecting portion on the first axial side and the surface of the second projecting portion on the second axial side are in contact with each other.

6. The motor according to claim 2, wherein an end portion of the first central tubular portion on the second axial side is on the second axial side relative to the fitting projection portion.

7. The motor according to claim 2, wherein
the bearing holder includes a bearing holding portion to hold the bearing;
the bearing holding portion includes a cylindrical tubular portion including an inner circumferential surface to which an outer circumferential surface of the bearing is fixed, an annular cover portion projecting radially inward from an end portion of the tubular portion on the first axial side, and an annular projecting portion being annular and projecting to the first axial side from a radially inner edge portion of the cover portion; and
a wall surface of the first central hole portion is defined by an inner circumferential surface of the cover portion and an inner circumferential surface of the annular projecting portion.

8. The motor according to claim 7, wherein the bearing is spaced apart from the cover portion to the second axial side.

9. A motor comprising:
a rotor including a shaft extending along a central axis;
a stator including coils and radially opposite to the rotor with a gap therebetween;
a bearing rotatably supporting the shaft;
a bearing holder on a first axial side of the stator to hold the bearing, and
a busbar unit on the first axial side of the bearing holder; wherein the busbar unit includes a plurality of busbars electrically connected to the coils, and a busbar holder to hold the busbars and located on the first axial side of the bearing holder;

each of the plurality of busbars includes a grasping portion to grasp a conducting wire extending from one of the coils;

the grasping portion includes a base portion, and a pair of arm portions extending from the base portion to a first circumferential side, and radially opposite to each other with a radial gap therebetween;

the conducting wire extending from the coil is located in the radial gap between the pair of arm portions;

the pair of arm portions in each of the grasping portions of the plurality of busbars extend from the base portion to a same side in a circumferential direction;

the bearing holder includes a bearing holder body, and a cylindrical second central tubular portion centered on the central axis, and projecting to the first axial side from the bearing holder body;

the busbar holder includes a second central hole portion centered on the central axis, and extending through the busbar holder in an axial direction;

the second central tubular portion is fitted in the second central hole portion;

one of the bearing holder and the busbar holder includes a hole portion recessed in the axial direction;

another one of the bearing holder and the busbar holder includes a fitting projection portion projecting in the axial direction;

the fitting projection portion is fitted in the hole portion; and an axial dimension of a portion of the second central tubular portion which is fitted in the second central hole portion is greater than an axial dimension of a portion of the fitting projection portion which is fitted in the hole portion.

* * * * *